April 18, 1944.  A. PEET  2,347,122
ELECTRIC WATER HEATER
Filed Nov. 30, 1942   5 Sheets-Sheet 2
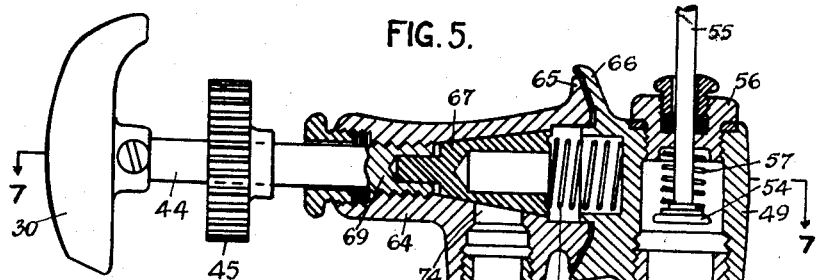
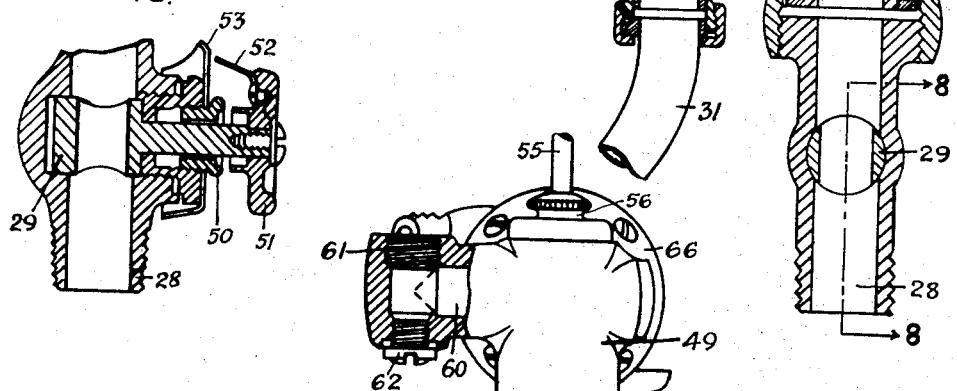
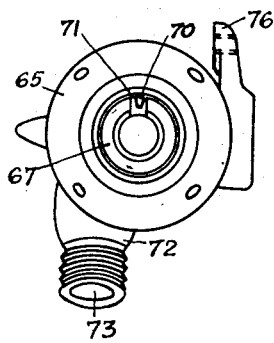
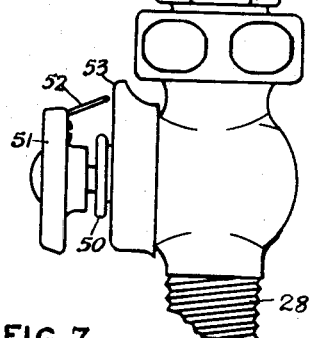
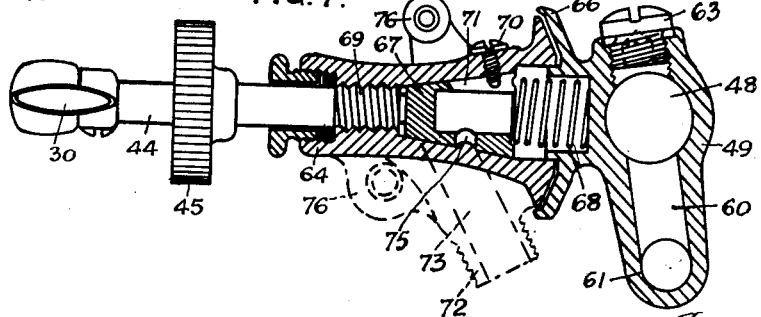
Inventor
Alexander Peet
By Williams, Bradbury & Hinkle
Attorneys Inventor:
Alexander Peet
By Williams, Bradbury & Hinkle
Attorneys April 18, 1944.   A. PEET   2,347,122
ELECTRIC WATER HEATER
Filed Nov. 30, 1942   5 Sheets-Sheet 4

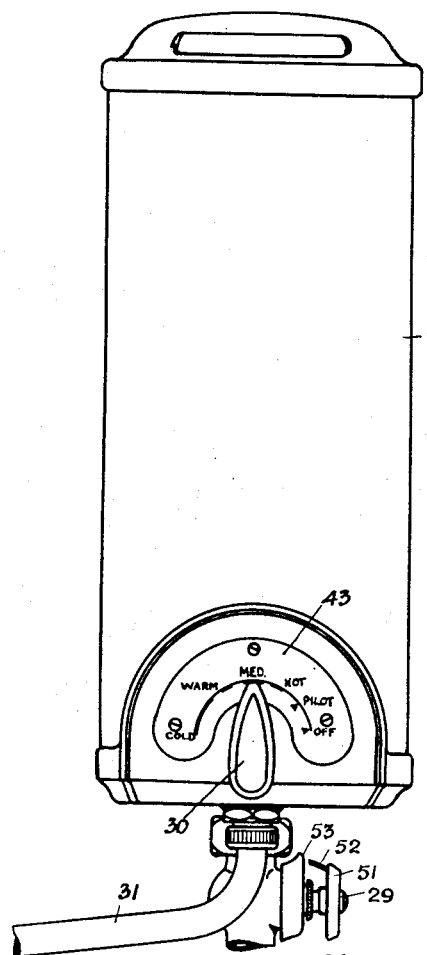
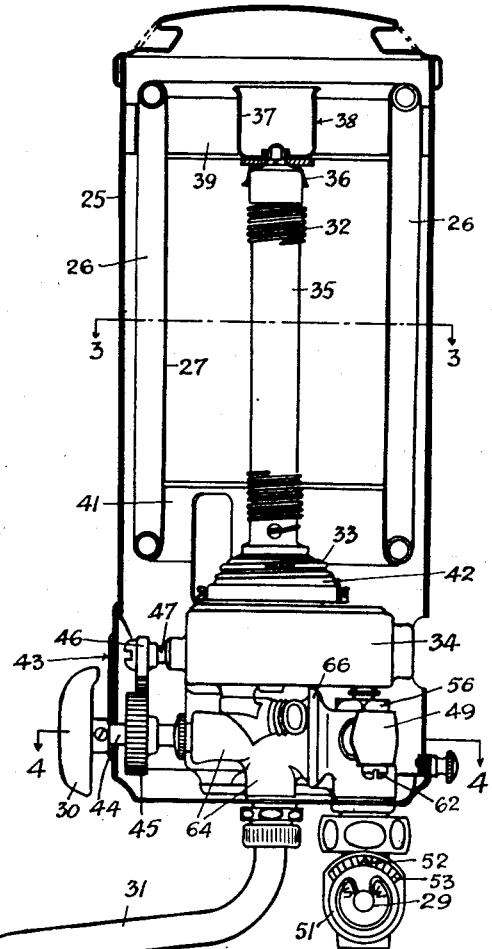

Inventor
Alexander Peet
By Williams, Bradbury & Hinkle

April 18, 1944.  A. PEET  2,347,122
ELECTRIC WATER HEATER
Filed Nov. 30, 1942  5 Sheets-Sheet 5

Inventor:
Alexander Peet
By Williams, Bradbury & Hinkle
Attorneys

Patented Apr. 18, 1944

2,347,122

UNITED STATES PATENT OFFICE 2,347,122

ELECTRIC WATER HEATER

Alexander Peet, Luton, England

Application November 30, 1942, Serial No. 467,322
In Great Britain January 24, 1942

20 Claims. (Cl. 219—39)

This invention has reference to electric water heating apparatus and has for its object to provide an apparatus which will give a rapid or almost instantaneous hot water supply and wherein the temperature of the water supply is regulated by adjusting the water flow while maintaining a constant heat input. A feature of the invention is the provision, in addition to one or more main heating elements, of one or more pilot heating elements adapted to give an efficient initial heat sufficient to enable the apparatus to attain maximum heat in a minimum period of time when the main heating elements are switched on.

An electric water heating apparatus according to the invention comprises one or more main electric heating elements enclosed in a metallic corrugated shell which also encloses one or more auxiliary electric heating elements or pilot elements of relatively low current consumption, a circuitous water heating pipe fitted in the corrugations of the shell, means for controlling the flow of water through the said water pipe, and means for controlling the electric current supply to the said heating elements.

The water heating pipe may take the circuitous form of a coiled pipe wound around the corrugated shell, in which case the corrugations are helically formed, or the water pipe may take a sinuous or zig-zag circuitous form fitted in corrugations formed longitudinally in the shell which surrounds the heating elements.

The electric heating elements may be of any known form, such as the known flat coil or grid or the helical type of resistance element, but it is preferred to employ a resistance element of the helical type wound upon or embedded in a radiant core of cylindrical or other form supported vertically and centrally within a hollow corrugated shell.

The pilot heating element or elements is or are preferably located in the lower part of the space enclosed by the corrugated shell and may be arranged below a central main vertical helical resistance element.

The circuitous water heating pipe preferably makes intimate contact to the extent of half or almost half the circumference of the pipe with corresponding semi-circular corrugations formed externally in the aforesaid shell, so that maximum heat transference by conduction is attained, the shell being heated by radiation from the heating elements and also by convection air currents created in the space between the heating elements and the shell.

The means for controlling the flow of water through the water heating pipe (that is to say, for controlling the supply of water from the apparatus), and the means for controlling the current supply to the electric heating elements are preferably operatively interconnected or interlocked with each other in such a manner that, when no water is being discharged, the main heating elements are inoperative, the current supply to the main heating elements occurring only when water is allowed to flow. The main heating elements may be simultaneously or progressively switched into the circuit. Inasmuch as the heat imparted to the water flowing through the water heating pipe will depend upon the time taken by the water in flowing through the pipe, it will be manifest that, if the heat input is kept constant, increasing the rate of discharge of water from the apparatus will decrease the temperature of the water supplied until the rate of discharge is such that the water is discharged at normal or nearly normal temperature. If desired, the heating elements may be arranged to be progressively switched on, or the current supply may be controlled by a thermostat or rheostat to compensate for increased rate of flow or decrease in the temperature of the water. When maximum outflow occurs, it is preferred that the water flow controlling means be arranged to cut off the current supply to at least the main heating elements, thus providing a cold water supply from the apparatus. The arrangement is such that the pilot heating element or elements can be switched on before water is drawn from the apparatus, so that the apparatus heats up in the shortest possible period of time when commencing to draw off water from the apparatus.

The inflow of water into the apparatus from the main water supply may be controlled by an adjustable throttle device to regulate the rate of water flow for different normal temperatures; for example, to suit summer and winter conditions, so that the temperature of the water supplied by the apparatus for a given rate of discharge will be the same or approximately the same at all seasons of the year.

A safety device is preferably incorporated in the apparatus to automatically cut off the electric current supply should the main water supply fail for any reason or be cut off.

In the preferred construction of the improved apparatus the tap or valve controlling the outflow of water and the means controlling the supply of current to the heating elements are simultaneously regulated by a single manually operable control knob or handle or like device, but separate hot and cold water taps may be provided if desired.

In one manner of carrying out the invention the apparatus is of the geyser type comprising a vertical outer casing enclosing the water heating pipe and heat conducting shell and the main heating element or elements in the upper part of said casing, the lower part of which houses the pilot heating element or elements, the outer inlet and outlet connections, and the control valve, as well as the electric current supply and control mechanism, the latter being controlled by a knob or handle mounted externally on the lower part of the outer casing. The electrical mechanism may be mounted as a separate unit or box in the lower part of the casing, the upper part of the unit or box carrying the pilot heating element or elements and sockets for the pins of one or more main vertical heating elements supported at the upper end in the upper part of the aforesaid shell. There is preferably provided in the water inlet passage a valve lifted by the main water pressure against the action of a spring or like device, this valve being operatively connected to a fuse or cut-out in the electric circuit to cut off the current supply in the event of failure of the main water supply. A hand operated throttle valve is also fitted in the water inlet passage to adjust the water inlet flow to suit the seasonal conditions. Heat radiating fins, shields, baffles or like devices may be fitted within the corrugated shell to utilise waste heat from the main heating element or elements. The water discharge from the apparatus may be through a swivelling spout or any form of outlet pipe. The water outlet is controlled by a manually operated valve, the spindle of which is preferably operatively connected to mechanism which controls the current supply to the heating elements. This mechanism may take the form of mercury switches, electro-magnetic switches, thermostatically-controlled switches, or rheostats and there may be one such for each heating element. The water outlet valve may be controlled by a knob movable over a dial graduated to indicate the on and off positions of the valve and to indicate when the pilot and main heating elements are respectively switched on. As the turning of the knob preferably controls both the water flow and the current supply, and it is necessary that the pilot heating element or elements should be capable of being switched on when no water is being drawn off, the knob spindle is preferably movable through a predetermined angle from the "off" position to a position in which the pilot heating element or elements is or are switched on and through a further predetermined angle before the water outflow valve opens and the main heating element or elements are switched on. Towards the fully open position of the water outlet valve, the main heating element or elements may be switched off, leaving only the pilot heating element or elements operative and thus providing a substantially cold water supply. The water outflow valve may be in the form of a hollow conical frustum lifted from a hollow conical valve seat by the knob-controlled spindle and closed by a spring and by the water pressure acting on the inside of the hollow conical valve.

Instead of maintaining a constant heat input with variation in the rate of outflow of the water, the heat input may be increased as the rate of water flow increases, or while maintaining a constant rate of water flow, in which cases the supply of current to the heating elements may be regulated by a thermostat or by means of a rheostat or variable resistance in the heating circuit.

The corrugated shell may take the form of a vertically corrugated cylinder or hollow body and be surrounded by a water pipe of annular sinuous form fitted in the corrugations, the upper and lower return bends of the sinuous pipe extending respectively above and below the shell. Alternatively, a helically corrugated shell may be surrounded by a helically coiled water pipe reversed upon itself so that both inlet and outlet ends are situated at the lower end of the shell.

In order that the invention may be more clearly understood, reference is hereinafter made to the accompanying explanatory drawings illustrating one form of electric water heating apparatus according to the invention.

Fig. 1 is a side view and Fig. 2 a view taken in section through the outer casing and water heating pipe. Figs. 3 and 4 are cross-sectional views on the lines 3—3 and 4—4 respectively of Fig. 2.

Figs. 5–9 are detail views of the water control mechanism, Fig. 5 being a sectional elevation and Fig. 6 an end elevation. Fig. 7 is a plan view in section on line 7—7 of Fig. 5, the inlet and outlet connections being omitted. Fig. 8 is a detail view in section on line 8—8 of Fig. 5 and Fig. 9 is an end elevation of the water valve casing.

Figure 20:
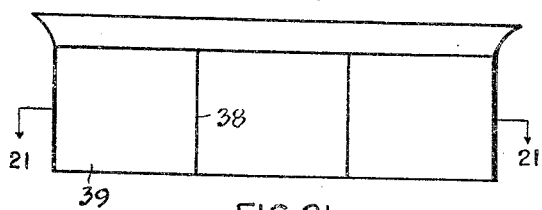
Figure 21:
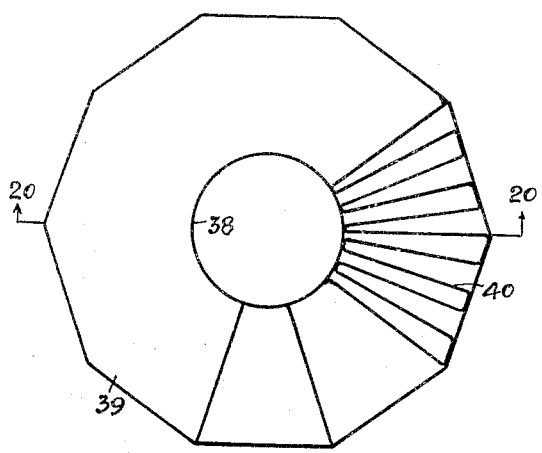

Figs. 20 and 21 are views of a heat radiating device shown at 39 in Fig. 2, Fig. 20 being a sectional side view on line 20—20 of Fig. 21 and Fig. 21 being a sectional plan on line 21—21 of Fig. 20 showing only a few of the heat radiating fins.

Figure 22:
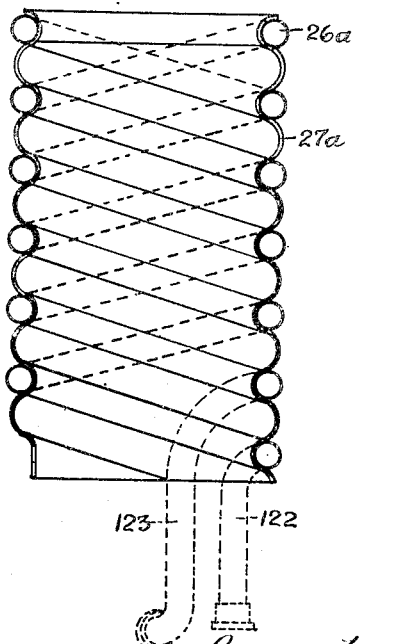

Fig. 22 is a sectional elevation showing an alternative form of corrugated shell supporting a coiled water pipe.

Referring firstly to Figs. 1–4, there is shown an outer casing 25 enclosing a water pipe 26 which is supported by a heat conducting shell 27 in the form of a vertically corrugated cylinder. The water pipe 26 is of annular sinuous form having upper and lower return bends connecting straight vertical portions which fit into the external corrugations of the shell 27. The water is supplied to the pipe 26 from the water main through an inlet connection 28 and water throttle 29 and after passing through the pipe 26 and through an outlet valve controlled by a handle 30, the water is discharged through an outlet spout 31. The water flowing through the pipe 26 is heated by electric heating elements 32 and 33 supported centrally within the apparatus upon a switch box 34. The main heating element 32 is of the helical type supported on a refractory core 35 which is supported at its upper end by a resilient inverted cup 36 attached to a centralising member 37 pressed into a central aperture 38 in a heat radiating device 39 (Figs. 20 and 21) which is fitted into the upper end of the sinuous water pipe 26. The device 39 is formed with heat radiating fins as shown at 40 in Fig. 21. Pressed into the lower end of the water pipe 26 is a shell 41, which may or may not have heat radiating fins similar to those shown in Fig. 21.

Figure 11:
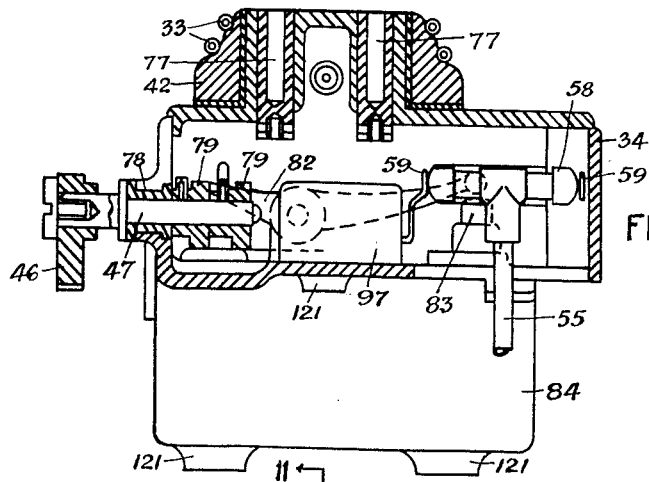
Fig. 11 is a sectional view on line 11—11 of Figs. 10 and 12.

The heating element 33 is a pilot heating element which is shown as being in the form of a volute spiral wound upon a core 42 (see also Fig. 11). This core 42 is mounted on the cover of the switch box 34 which has sockets to receive the pins of the detachable main heating element 32.

As seen in Fig. 1, the control handle 30 moves over a suitably graduated dial 43. The spindle 44 of the handle 30 carries a gear wheel 45 which meshes with a toothed quadrant gear wheel 46 on a spindle 47 which passes into the switch box 34 (Fig. 11) and controls the current supply to the heating elements 32 and 33 so that when the handle 30 is in the "off" position (Fig. 1) the current supply to the heating elements is cut off. Movement of the handle 30 to the "pilot" position in Fig. 1 causes current to be supplied to the pilot heating element 33. Further anti-clockwise movement of the handle 30 opens the water outlet valve hereinafter described with reference to Figs. 5-9. At the same time current is supplied to the main heating element 32, so that when the handle 30 reaches the "hot" position in Fig. 1, the water outlet valve is partially open and the slow water flow through the pipe 26 is subjected to the heat from both of the heating elements 32 and 33. Further movement of the handle 30 to the "med." and "warm" positions indicated in Fig. 1 gradually opens the water valve still further, while the heat input remains constant. When the handle 30 is moved beyond the "warm" position, the water valve is fully opened and the current supply to the main heating element 32 is cut off, resulting in a substantially cold water supply from the apparatus.

Referring now more particularly to Figs. 5-9, water passes from the mains through the inlet connection 28 and through the water throttle valve 29 to an inlet passage 48 in a valve body 49. The throttle valve 29 is a rotary plug valve, the spindle of which passes through a stuffing gland 50 and is provided with an operating handle 51 having a pointer 52 movable over a graduated scale 53. By operating the handle 51, the inflow of water can be controlled to regulate the water flow to suit different seasonal conditions, e. g., summer and winter. In the valve body 49 is a plunger 54, the spindle 55 of which passes through a stuffing gland 56. The pressure of water entering the valve body 49 raises the plunger 54 against the action of a spring 57 on the spindle 55, thus raising the spindle 55 to hold a fuse 58 (Fig. 11) in operative position. Should the water supply fail, the spring 57 forces down the plunger 54, and its spindle 55 which is attached to the fuse 58 dislodges the fuse from between its spring contacts 59 (Fig. 11). The plunger 54 thus acts as a safety device to cut off the electric current to the heating elements should the water supply fail.

The inlet connection 48 communicates by way of a passage 60 (Figs. 6 and 7) with a screw-threaded hole 61 providing a connection to the inlet end of the water flow pipe 26. The passage 60 also leads to a drain plug 62. For ease of manufacture the passage 60 is drilled through the valve body 49 and the open end sealed with a plug 63.

Secured to the side of the valve body 49 is a water outflow valve comprising a valve casing 64 flanged at 65 for screwing or bolting to a flange 66 on the body 49, and a hollow valve plug 67 operated against the pressure of a spring 68 by a screw-threaded spindle 69 which forms an extension of the spindle 44 carrying the control handle 30. By turning the handle 30, the plug 67 can be moved axially against the pressure of the spring 68. The plug 67 is of tapered conical form seating in a corresponding seat in the valve casing 64. The plug 67 is prevented from rotation by a locating pin 70 working in a slot 71 in the plug. The outlet end of the water flow pipe 26 is coupled to a connection 72 having therein a passage 73 which opens into the valve casing 64, and an outlet port 74 in the valve casing 64 leads to the swivelling outlet spout 31. A small hole 75 in the plug 67 admits water into the hollow interior of the plug 67 and into the space housing the spring 68. The area of the plug 67 at its larger end is such as to ensure that a closing pressure is exerted by the water entering the plug.

As already described, the control handle 30, which also controls the current supply to the heating elements, is arranged to move from the "off" position to the "pilot" position in which the pilot heating element is switched on without allowing the water to flow through the pipe 26. The screw-threaded spindle 69 is therefore arranged to revolve anti-clockwise through a limited angle before it commences to displace the plug 67 from its seat. When the handle 30 is turned anti-clockwise past the "pilot" position, the spindle 69 displaces the plug 67 from its seat and water from the pipe 26 commences to flow through passage 73 into the space around the plug 67 and from thence through the outlet port 74 to the spout 31, the rate of water flow increasing with further anti-clockwise movement of the handle 30 until the valve is fully open. Bosses 76 are provided on the valve casing 64 for securing it to the underside of the switch box 34.

Figure 10:
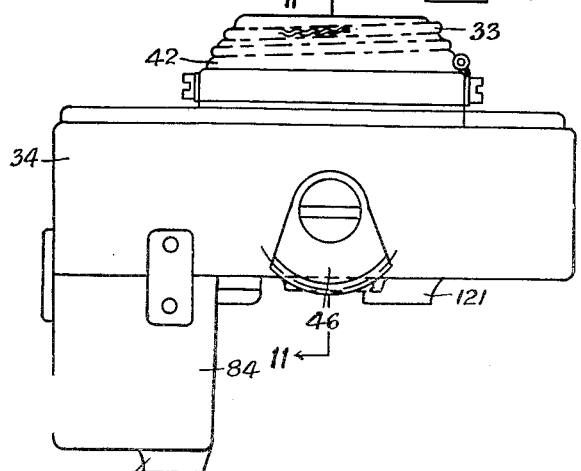
Fig. 10 is a side view of the switch box.
Figure 12:
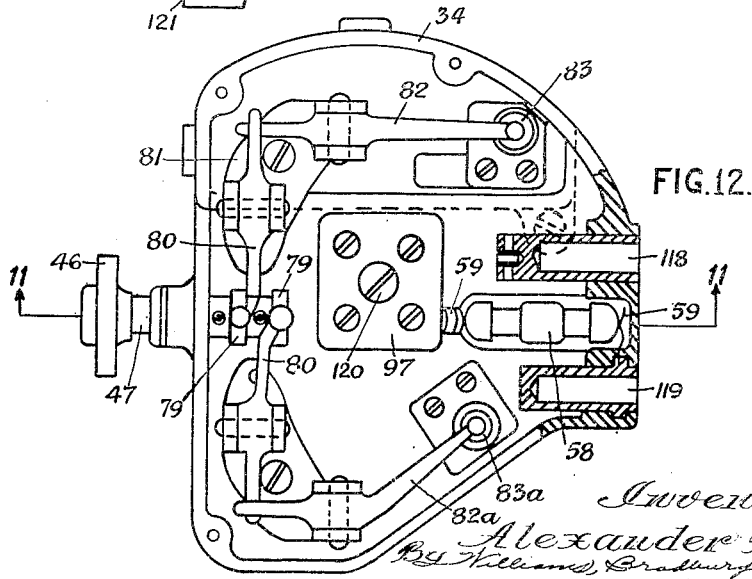
Fig. 12 is a plan view of the switch box with the cover removed.
Figure 13:
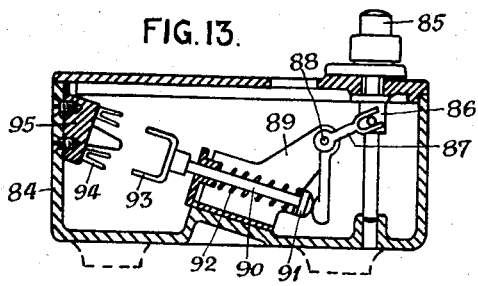
Fig. 13 is a sectional elevation of a mechanically controlled form of switch.
Figure 15:
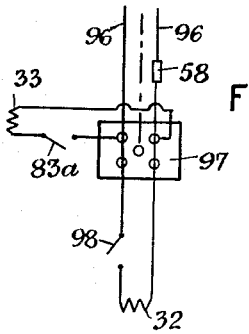
Figs. 15 and 16 are corresponding wiring diagrams.
Figure 14:
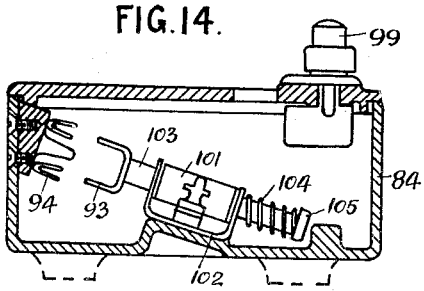
Fig. 14 is a view corresponding to Fig. 13 showing an electro-mechanically controlled form of switch.

Referring now to Figs. 10-12, the switch box 34 supports the pilot heating element 33 and its core 42 and also supports sockets 77 adapted to receive the pins of the detachable heating element 32. As hereinbefore mentioned, the spindle 44 of the control handle 30 carries a gear wheel 45 which meshes with the quadrant wheel 46 on the spindle 47. This spindle turns in a bearing 78 in the switch box 34 and carries a pair of cams 79 which coact with the ends of a pair of rockers 80 supported in brackets 81. Each rocker 80 coacts at its other end with one arm of a rocker 82 or 82ª, the other arm of which presses upon the upper end of a vertical plunger, the rocker 82 pressing on a plunger 83 and the rocker 82ª pressing on a plunger 83ª. The plunger 83ª operates any suitable form of electric switch controlling the electric current supply to the pilot heating element 33. Beneath the switch box 34 and detachably secured thereto is a housing 84 which contains switch mechanism for controlling the current supply to the main heating element 32, this switch mechanism being actuated by the plunger 83. In Figs. 13 and 14 there are illustrated alternative forms of switch mechanism for this purpose, Fig. 13 illustrating a mechanical form of switch and Fig. 14 illustrating an electro-mechanical form of switch. The switch mechanism illustrated in Fig. 13 comprises a push rod 85 which contacts with the rocker 82. Attached to the push rod 85 is an adjustable sleeve 86 having projections which engage the slotted and bifurcated end of a bell-crank lever 87 pivoted on a pin 88 carried by a cradle 89 which supports a plunger 90 having a head 91 pressed by a spring 92 against the depending arm of the bell-crank lever 87. When the push rod 85 is depressed by the rocker 82, the lever 87 presses the plunger 90 towards the left in Fig. 13 until a contact piece 93 on the plunger 90 engages spring contacts 94 and closes an electrical circuit through the main heating element 32. For this purpose the spring contacts 94 are carried by a terminal block 95 secured to the housing 84 and are wired to the sockets 77 of the main heating element. The contact piece 93 is insulated from the plunger 90. Fig. 15 is a wiring diagram illustrating the connections to the main and pilot heating elements. The main current leads 96 are connected to a junction box 97 through the fuse 58. The pilot heating element 33 is controlled by the switch 83a and the main heating element is controlled by the switch 98 represented by the parts 93 and 94 in Fig. 13.

Figure 16:
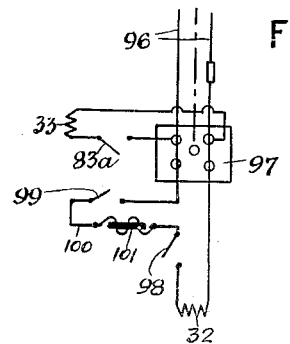

In the electro-mechanical form of switch shown in Fig. 14, which may replace the switch construction shown in Fig. 13, the rocker 82 (Fig. 12) controls a preliminary switch 99 in a shunt circuit 100 (Fig. 16) including an electro-magnet 101 carried in a cradle 102 attached to the base of the housing 84. When the switch 99 is depressed by the rocker 82, the shunt circuit 100 is closed to energize the electro-magnet 101, causing its plunger 103 to move towards the left in Fig. 14 against the pressure of a spring 104 between the cradle 102 and a head 105 on the plunger 103. The plunger 103 carries the insulated contact piece 93 for engagement with the spring contacts 94 wired to the main heating element 32, the parts 93 and 94 constituting the switch 98 as in Figs. 13 and 14.

Figure 17:
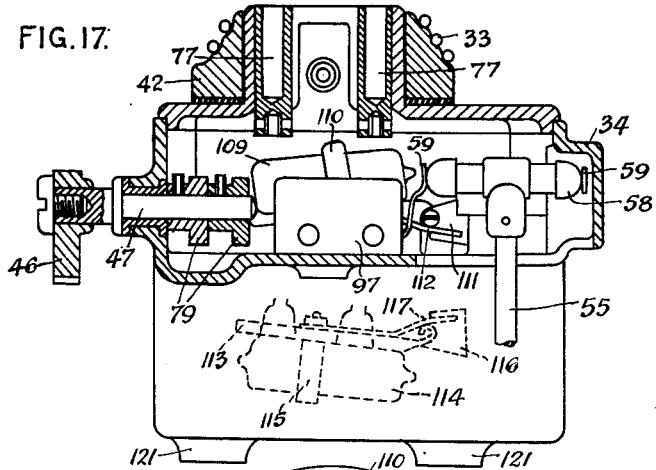
Figs. 17, 18 and 19 are views showing an alternative form of electric switch in the form of a mercury switch.
Figure 18:
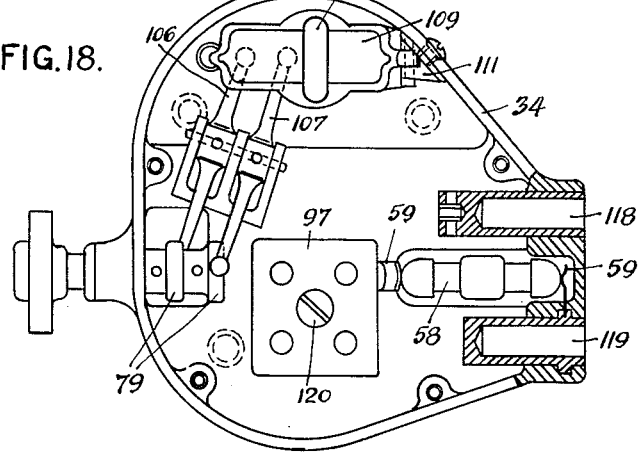
Figure 19:
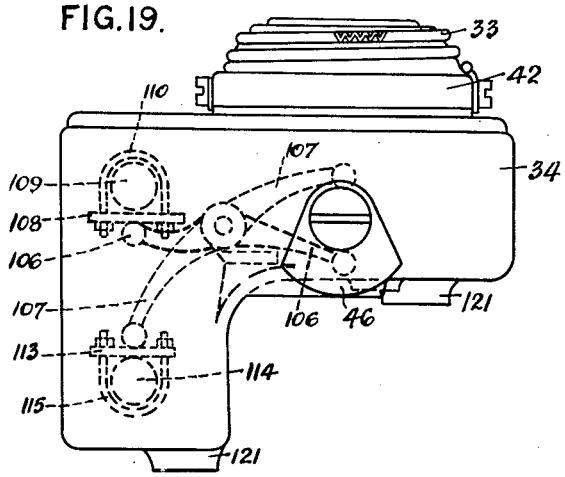

Figs. 17, 18 and 19 are views showing a form of mercury switch mechanism which may replace the parts shown in Figs. 10-14. The wiring diagram shown in Fig. 15 is also applicable to the switch mechanism shown in Figs. 17-19 wherein the cams 79 on the spindle 47 coacts with the ends of a pair of rockers 106 and 107. The rocker 106 bears at its other end against the underside of a carrier 108 to which a mercury tube 109 is held by a strap 110. The carrier 108 is pivotally attached to the switch box 34 by a bracket 111 and attached to the carrier 108 is a flat spring 112 which slides into a slot in the bracket 111. The spring 112 serves to keep the carrier 108 in contact with the end of the rocker 106 and the mercury tube functions in known manner as a switch, electrodes in the mercury tube being wired to the sockets 77 on the main heating element 32. The mercury tube 109 is therefore diagrammatically represented by the switch 98 in Fig. 15. The rocker 107 bears at its other end upon a carrier 113 which supports a mercury tube 114 held thereto by a strap 115, the carrier 113 being pivotally attached to a bracket 116 and being urged into contact with the end of the rocker 107 by a spring 117. Electrodes in the mercury tube 114 are wired to the pilot heating element 33 and the mercury tube thus functions as a switch for controlling the current supply to the pilot heating element as diagrammatically indicated by the switch 83a in Fig. 15.

It will be apparent that rotation of the spindle 47 causes the rockers 106 and 107 to tilt the mercury switches 109 and 114 and thus makes or breaks the circuit to the main or pilot heating elements according to the angular movement of the spindle 47 and the shape of the cams 79 which are so shaped as to operate the switches according to the markings on the dial 43 (Fig. 1), that is to say, when the handle 30 is at the "pilot" and "cold" positions, the mercury switch 114 will complete the circuit to the pilot heating element and the mercury switch 109 will break the circuit to the main heating element. When the handle 30 is at the positions marked "hot," "med." and "warm," both the main and pilot heating elements will be supplied with current through the mercury switches 109 and 114.

In the constructions shown in Figs. 10-14 and 17-19, connection to the electric main is made by inserting a mains plug into sockets 118 and 119, when current passes through the fuse 58 to the junction box 97, and from thence to the pilot heating element 33 and the sockets 77 for the main heating element 32. Connections from the junction box 97 also lead to the mercury switches 109 and 114 (Figs. 17-19) or to a pilot element switch controlled by the plunger 83a (Figs. 10-12) and to the spring contacts 94 (Figs. 14 and 15). The junction box 97 may be attached to the switch box 34 by a single screw 120 which may serve as an earth connection. The switch box 34 may be mounted on the water valve casing 64 (Figs. 5-9), tapped bosses 121 being provided on the box 34 and housing 84 for connection to the tapped bosses 76 on the valve casing 64.

Fig. 22 illustrates an alternative design of water pipe and supporting shell which may be adopted instead of the form shown in Figs. 2 and 3. In the form shown in Fig. 22, the shell 27a is of helically corrugated form and is surrounded by a helically coiled water pipe 26a reversed upon itself so that the inlet and outlet ends 122 and 123 are both situated at a point convenient for attachment to the connections 61 and 72 on the water valve assembly (Figs. 5-9).

It is to be understood that the details of construction of the water heater herein described with reference to the accompanying drawings are given only as an example and are capable of varied modification within the scope of the appended claims.

I claim:

1. An electric water heating apparatus comprising one or more main electric heating elements and one or more auxiliary or pilot electric heating elements, a metallic corrugated shell surrounding said elements, a circuitous water heating pipe fitted in the corrugations of said shell, means for controlling the flow of water through said pipe, and means for controlling the electric current supply to said elements.

2. An electric water heating apparatus comprising a main electric heating element and a pilot electric heating element both surrounded by a metallic heat conducting shell, a water-heating pipe circuitously arranged around and in thermally conductive contact with the outside of said shell, an outer casing surrounding said pipe, a water inlet connection to said pipe, a valve-controlled outlet spout leading from said pipe, and switch mechanism for controlling the current supply to said heating elements to cause said pilot heating element to heat the water in said pipe before the main heating element becomes operative.

3. In an electric water heater, an outer casing, a water pipe within and spaced from said casing, a metallic heat-conductive shell within the water pipe and in intimate thermal contact therewith, main and pilot electric heating elements disposed within the shell and spaced therefrom, the pilot heating element being disposed below the main heating element and having a relatively low rate of current consumption, switch means for controlling the current supply to said heating elements, and a water valve controlling the outflow from said water pipe.

4. An electric water heater comprising main and pilot electric heating elements, a longitudinally corrugated metallic shell surrounding said elements, a sinuous water pipe fitted in the corrugations of said shell, means for controlling the water flow through said pipe, and means for controlling the electric current supply to said elements.

5. An electric water heater comprising main and pilot electric heating elements, a metallic shell surrounding said elements, said shell having helically formed corrugations therein, a helically coiled water pipe surrounding said shell and fitted in the corrugations thereof, means for controlling the water flow through said pipe, and means for controlling the electric current supply to said elements.

6. An electric water heater having main and pilot electric heating elements, a metallic corrugated shell surrounding said elements and having its axis vertically disposed, means for supporting said elements centrally within said shell, a circuitous water pipe surrounding said shell and fitted into the corrugations thereof, means for controlling the water flow through said pipe, and means for controlling the electric current supply to said elements.

7. An electric water heater comprising a metallic corrugated shell, a plurality of electric heating elements enclosed by said shell and including a pilot heat element of relatively low current consumption located in the lower part of the space enclosed by said shell, a circuitous water pipe surrounding said shell and fitted into the corrugations thereof, means for controlling the water flow through said pipe, and means for controlling the electric current supply to said elements.

8. An electric water heater comprising a main electric heating element vertically disposed above a pilot electric heating element of relatively low current consumption, a corrugated metallic shall surrounding said elements, a circuitous water pipe surrounding said shell and fitted into the corrugations thereof, means for controlling the water flow through said pipe, and means for controlling the electric current supply to said element.

9. An electric water heater comprising main and pilot electric heating elements, a metallic shell surrounding said elements and having corrugations of semi-circular cross-section formed therein, a circuitous water pipe surrounding said shell, said pipe being of substantially the same diameter in cross-section as the diameter of said corrugations and said pipe making intimate contact with said corrugations to the extent of substantially half the circumference of said pipe, means for controlling the water flow through said pipe, and means for controlling the electric current supply to said elements.

10. An electric water heater comprising main and pilot electric heating elements, a corrugated open-ended metallic shell surrounding and spaced from said elements whereby said shell is heated both by radiation of heat from said elements and also by convection air currents created in the space between said elements and said shell, a circuitous water pipe surrounding said shell and fitted into the corrugations thereof, means for controlling the water flow through said pipe, and means for controlling the electric current supply to said elements.

11. An electric water heater comprising main and pilot electric heating elements, a corrugated metallic shell surrounding said elements, a circuitous water pipe fitted in the corrugations of said shell, means for controlling the flow of water through said pipe, means for controlling the electric current supply to said elements, and means operatively interconnecting the water flow controlling means with the current controlling means to cause current to be supplied to the main heating element or one or more main heating elements only when water flows through said pipe.

12. An electric water heater comprising main and pilot electric heating elements, a corrugated metallic shell surrounding said elements, a circuitous water pipe fitted in the corrugations of said shell, means for controlling the flow of water through said pipe, means for controlling the electric current supply to said elements, the current controlling means being arranged to supply current to the pilot heating element or each pilot heating element before the water flow controlling means operates to permit the flow of water through said pipe.

13. An electric water heater comprising main and pilot electric heating elements, a corrugated metallic shell surrounding said elements, a circuitous water pipe fitted in the corrugations of said shell, means for controlling the flow of water through said pipe, means for controlling the electric current supply to said elements, the current controlling means being arranged to supply current to the pilot heating element or each pilot heating element before the water flow controlling means operates to permit the flow of water through said pipe and maintaining such current supply so long as water flows through said pipe.

14. An electric water heater comprising main and pilot electric heating elements, a corrugated metallic shell surrounding said elements, a circuitous water pipe fitted in the corrugations of said shell, means for controlling the flow of water through said pipe, means for controlling the electric current supply to said elements, and means operatively interconnecting the water flow controlling means with the current controlling means to cause current to be supplied to the main heating element or one or more main heating elements only when water flows through said pipe and arranged to cut off the current supply to the main heating elements or each of said main heating elements when maximum water flow occurs through said pipe.

15. An electric water heater comprising main and pilot electric heating elements, a corrugated metallic shell surrounding said elements, a circuitous water pipe fitted in the corrugations of said shell, means for controlling the flow of water through said pipe, means for controlling the electric current supply to said elements, and means operatively interconnecting the water flow controlling means with the current controlling means to cause current to be supplied to the main heating element or one or more main heating elements only when water flows through said pipe and arranged to cut off the current supply to the main heating elements or each of said main heating elements when maximum water flow occurs through said pipe and to maintain a constant current supply to said main heating elements or each of said main heating elements to maintain a substantially constant heat input with increase or decrease in the rate of water flow controlled by said water flow controlling means.

16. An electric water heater comprising main and pilot electric heating elements, a corrugated metallic shell surrounding said elements, a circuitous water pipe fitted in the corrugations of said shell, means for supplying and regulating the rate of inflow of water into said pipe, means for controlling the rate of outflow of water from said pipe, and means for controlling the electric current supply to said elements.

17. An electric water heater comprising main and pilot electric heating elements, a corrugated metallic shell surrounding said elements, a circuitous water pipe fitted in the corrugations of said shell, means for supplying and regulating the rate of inflow of water into said pipe, means for controlling the rate of outflow of water from said pipe, and means for controlling the electric current supply to said elements, said electric current controlling means including a circuit breaker arranged to cut off the current supply automatically in the event of failure of the water supply to said pipe.

18. An electric water heater comprising main and pilot electric heating elements, a corrugated metallic shell surrounding said elements, a circuitous water pipe fitted in the corrugations of said shell, means for controlling the flow of water through said pipe, means for controlling the electric current supply to said elements, a manually-operable control device and means operatively interconnecting said device with both the water flow controlling means and the current controlling means whereby operation of said device simultaneously regulates both the water flow and the current supply.

19. An electric water heater comprising main and pilot electric heating elements, a corrugated metallic shell surrounding said elements, a circuitous water pipe fitted in the corrugations of said shell, means for controlling the flow of water through said pipe, means for controlling the electric current supply to said elements, a manually-operable control device and means operatively interconnecting said device with both the water flow controlling means and the current controlling means whereby operation of said device simultaneously regulates both the water flow and the current supply, said device being movable from an "off" position in which the water flow is prevented and the current supply is cut off, to intermediate positions in which current is first supplied to the pilot heating element or each pilot heating element and thereafter to the main heating element or each main heating element with opening and progressive increase in the rate of the water flow until said device is moved to a position in which the water flow attains a maximum and the current supply to the main heating element or each of the main heating elements is cut off.

20. An electric water heater comprising a main electric heating element and a pilot electric heating element, a corrugated metallic shell surrounding and spaced from said elements, a circuitous water pipe surrounding said shell and fitted into the corrugations of said shell, an outer casing surrounding and enclosing said pipe, means for supplying and regulating the inflow of water to said pipe, a water valve controlling the outflow of water from said pipe, switch means controlling the current supply to said heating elements, mechanism interconnecting said water valve to said switch means whereby the actuation of said mechanism regulates or controls the opening and closing of said valve and simultaneously regulates the supply of the current to the heating elements through said switch means, and a manually-operable control device for actuating said mechanism.

ALEXANDER PEET.